No. 626,729. Patented June 13, 1899.
J. S. SMITH.
PROCESS OF AND APPARATUS FOR DEHYDRATING GAS.
(Application filed Apr. 30, 1897.)
(No Model.)
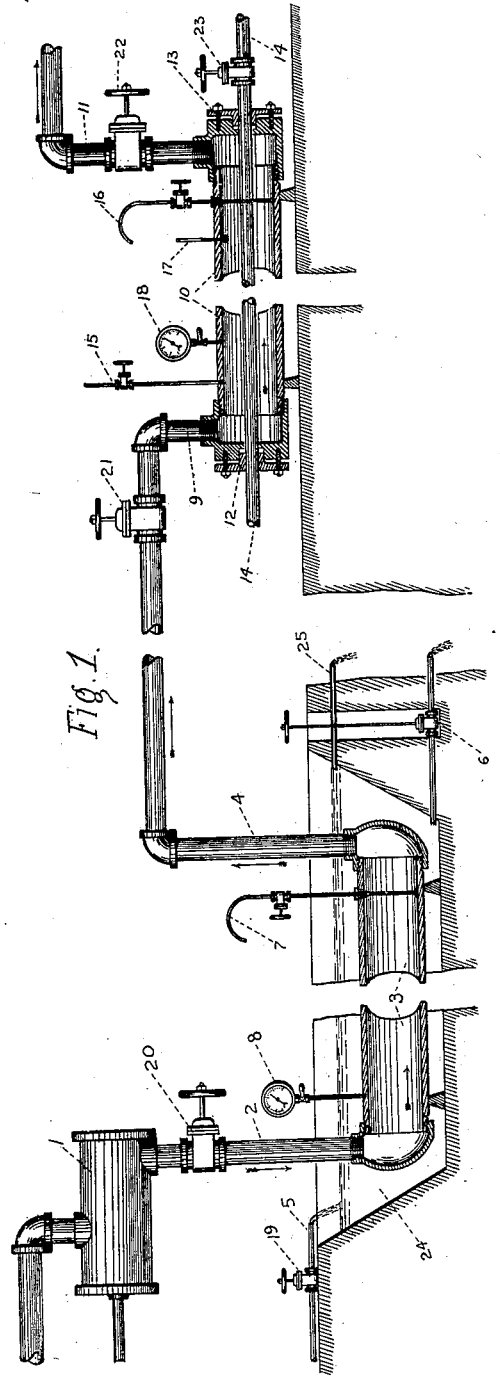
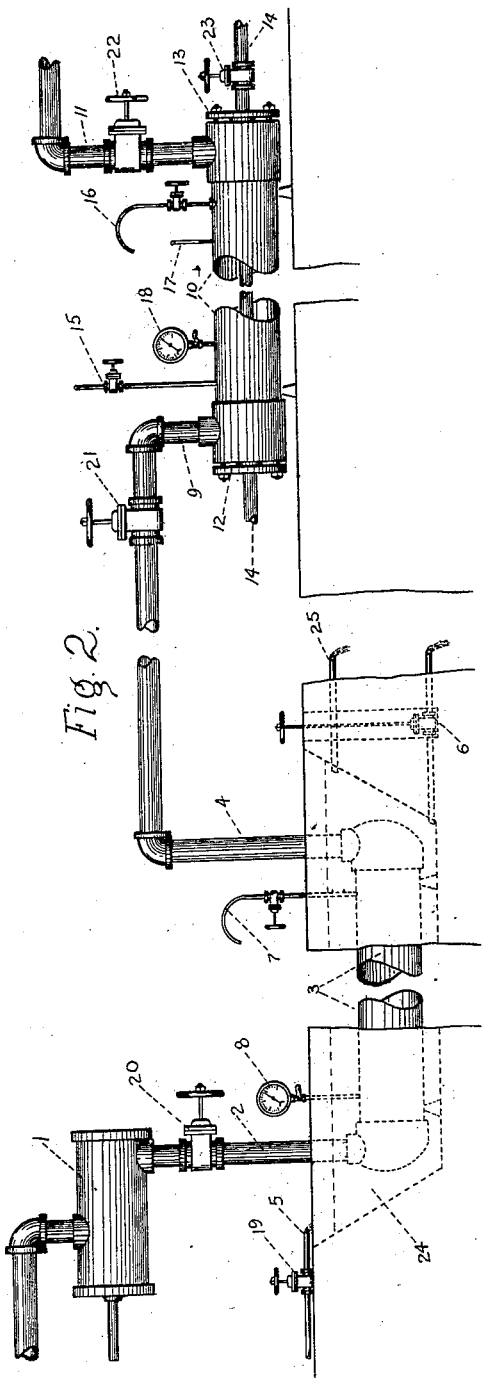
Fig. 1.
Fig. 2.
Witnesses:
Hiram Barber
James Allingham
Inventor:
Jacob S. Smith
by Geo. F. Ort, Attorney

UNITED STATES PATENT OFFICE.

JACOB S. SMITH, OF CHICAGO, ILLINOIS.

PROCESS OF AND APPARATUS FOR DEHYDRATING GAS.

SPECIFICATION forming part of Letters Patent No. 626,729, dated June 13, 1899.

Application filed April 30, 1897. Serial No. 634,571. (No model.)

*To all whom it may concern:*

Be it known that I, JACOB S. SMITH, a citizen of the United States, residing in the city of Chicago, county of Cook, and State of Illinois, have invented a new and useful Process of and Apparatus for Dehydrating Gas, of which the following is a specification.

My invention relates to means for and methods of removing moisture contained in gas and to a degree which shall prevent precipitations in mains and other conduits conducting gas to its destination, and this however great their length may be.

The prime object of my invention is to remove moisture from gas by compression and in such a manner that the moisture it contains will be arrested and settle at a point where it may either be removed, drawn off, or rendered incapable of reabsorption.

A further object of my invention is to dehydrate gas by compression and at the same time maintain a continuous and uniform flow of gas through the main or other conductor from the source of supply to the destination of the gas.

Another object is to dehydrate gas by the employment of pressure in connection with a temperature cooling the gas and precipitating moisture, with or without reducing the precipitations to a condition rendering them incapable of reabsorption by the gas.

A still further object is to utilize pressure precipitating moisture from gas for discharging the precipitations from the pressure of the gas.

Generally speaking, my invention includes a method and apparatus by which gas is artificially compressed to a degree of pressure less than that at which the gas liquefies, but to a sufficient pressure to stagnate or arrest the moisture, and there is added to and subtracted from the compressed volume in substantially equal proportions, so that the gas will be maintained at substantially a uniform pressure at the point where the moisture is arrested, and the water of condensation may be drawn off without necessarily interrupting the continuous and uniform flow of the gas through the mains, and by which the precipitation of the moisture at the point at which it is arrested by the described compression may be considerably augmented by cooling the gas below a natural temperature or to a degree at least sufficient to absorb the heat of compression at such point, so that this moisture, which is more or less vaporous, will be congealed or thrown down in the form of liquid and the abnormally cool gas will not possess sufficient heat to again vaporize and absorb it, and also by which, after the gas has passed through the dehydrating process thus described and still contains an objectionable amount of moisture, the remaining portion may be extracted by subjecting the gas to simultaneous compression and refrigeration—that is, to a degree of cold sufficient to convert the moisture into ice—as will be more fully explained hereinafter.

My invention also relates to the removal of the products of condensation in any suitable way—as, for example, the mere water of condensation thrown down by the first step of the method may be extracted by simply opening a duct for it; but the ice resulting from the refrigerating operation should first be melted and the water then extracted through a suitable outlet, which melting of the ice may be effected by injecting a cleansing or melting fluid into the refrigerating-chamber or by admitting to the refrigerating-chamber for a short period the gas from the compressor without preliminary cooling, so that the heat of the compressed gas may be utilized for melting the ice.

The apparatus comprises a pipe or receptacle into which the gas is compressed, the temperature of the gas in this receptacle being maintained at normal degree. The compression thus applied produces voluntary precipitation within the receptacle, and the resulting liquid is forced therefrom through an exit-duct by the pressure of the gas in the receptacle. From this receptacle the gas passes in a compressed condition into a second receptacle, wherein it is subjected to a temperature below that of the gas, and the moisture in the gas is thus frozen or precipitated within the receptacle. Then steam or heated gas or air is introduced into the receptacle to liquefy the condensation, and the liquid thus formed is forced from the receptacle through an exit-duct by the pressure of the gas.

Gas usually carries in suspension aqueous vapor, the quantity of which is proportioned to the temperature of the gas. This temperature in natural gas as it flows from the well averages about 55° Fahrenheit. If the gas in this condition be compressed, a certain amount of the aqueous vapor carried in suspension will be voluntarily precipitated, the amount of such precipitation being proportioned to the space within which the gas is compressed. The smaller the space into which the gas is forced the more copious will be the precipitation of the moisture. If the temperature of the gas so dehydrated by compression be reduced below the normal temperature, a certain proportion of the vapor in the gas will be deposited in the form of liquid, and if the temperature be reduced sufficiently the precipitation will take the form of frost or ice. Thus if the pipe or receptacle containing the gas be cooled to the freezing-point, or 32° Fahrenheit, the greater portion of the moisture carried by the gas will be deposited as liquid and may be drawn off. If the gas be cooled below 32°, the deposit will take the form of frost or ice and may then be heated to form a liquid, which may be drawn off as before.

In carrying out my invention I employ a receptacle wherein the gas is maintained at or near a normal temperature and is dehydrated by compression, such compression producing voluntary precipitation of the moisture which the gas carries in suspension, and the resulting liquid is then forced from the receptacle by the pressure of the gas. A second receptacle is then employed, into which the gas thus dehydrated and at normal temperature is introduced in a compressed state. The gas within this second receptacle is subjected to a temperature lower than the initial temperature of the gas by expanded gas or other mediums in a pipe within said second receptacle. The temperature of the gas is thus reduced to such an extent that a large proportion of the vapor in suspension in the gas will be precipitated in the form of liquid, frost, or ice, depending upon the degree of temperature applied. When in the form of frost or ice, the deposit may be melted by introducing into the receptacle steam or gas at a higher temperature, produced by means of the compression-receptacle. In the operation of this dehydrater the deposits resulting from the precipitation are withdrawn through duct-openings near the bottom of the receptacles.

I have illustrated this apparatus in the accompanying drawings, in which—

Figure 1 is a sectional view of the dehydrater. Fig. 2 is a view thereof in elevation.

Similar numbers refer to similar parts in both views.

The cylinder 1 is an ordinary compressor equipped with the usual cooling appliances.

3 is the compression-receptacle and is connected with the cylinder 1 by the pipe 2, which is the outlet of the cylinder 1 and the inlet to the receptacle 3.

4 is the outlet from the receptacle 3. This receptacle 3 is immersed in the water-tank 24, which is supplied through the pipe 5 and drained through the pipes 6 and 25 to maintain the normal temperature of the gas in the receptacle.

7 is an exit-duct inserted into the receptacle 3 and extends to the bottom of the receptacle.

8 is an ordinary gage for observing the degree of pressure in the receptacle 3.

10 is the refrigeration-receptacle, of which the pipes 9 and 15 are the inlets, the outlet being pipe 11, which has a valve 22 and connects the receptacle 10 with the pipe-line or mains beyond. This receptacle 10 is formed of a casing closed at the ends by means of stuffing-boxes and caps 12 and 13.

14 is a pipe which extends longitudinally through this receptacle 10 and said stuffing-boxes 12 and 13 and carries a valve 23. The outlet-pipe 4 and inlet-pipe 9 connect the compression-receptacle 3 and the refrigeration-receptacle 10 and are intersected by the valve 21.

16 is an exit-duct inserted into the receptacle 10 and extends to the bottom of the receptacle.

17 is a thermometer attached to the receptacle 10 to indicate the degree of temperature, and 18 is a gage attached to the receptacle 10 to indicate the pressure applied to the gas.

The operation of this apparatus is as follows: The gas is impacted by means of the cylinder 1 and compressed into the receptacle 3, said receptacle being immersed in the water-tank 24 to maintain the normal temperature of the gas. In this receptacle 3 the voluntary precipitation as a result of the compression of the gas occurs, and the liquid thus collected is forced out of the receptacle 3 through the exit-duct 7 by the pressure of the gas. The higher the compression the more copious will be the precipitation. After this dehydration the gas passes out of the receptacle 3 by way of the pipe 4 and into the receptacle 10 by way of the pipe 9. The gas is then at a normal temperature and in a compressed state. After the gas reaches the receptacle 10 it is subjected to a low temperature by means of expanded gas or other mediums in the pipe 14. This causes the precipitation of the moisture in suspension in the compressed gas, and the liquid thus formed is then forced from the receptacle 10 through the exit-duct 16 by the pressure of the gas. The lower the degree of temperature to which the gas is subjected the more complete will be the precipitation of the moisture carried in suspension. If the degree of temperature introduced into the receptacle 10 through the pipe 14 be sufficiently low, the precipitation will take the form of frost or ice. The frost or ice so formed may be melted by the introduction of steam into the receptacle through the pipe 15 or preferably by shutting off the cooling agents in pipe 14 by means of the valve 23 and cutting off the supply of water through pipe 5 by means of the valve 19 and opening valve 6, thus causing the gas in its passage through the receptacle 3 to rise to a higher temperature as a result of the compression therein, and the gas so heated or the steam in passing into the receptacle 10 by the pipes 9 and 15 melts the congealed mass. Then by opening the valve in the exit-duct 16 the pressure of the gas in the receptacle will eject the liquid thus accumulated. The valve 22 is employed to maintain at any desired degree the pressure in the apparatus obtained by means of the cylinder 1; but it may and very generally does occur that the back pressure in the pipes beyond my apparatus is equal to the pressure desired in the apparatus and moves away with no greater speed than is necessary to maintain the desired pressure in the apparatus, in which case the valve 22 may be wide open, so that by manipulating the valve 22 according to the supply, outlet, and desired degree the pressure in the apparatus may be maintained, as above indicated. Where it is desired to use the heated gas to reduce the condensation in the receptacle 10 to a melting temperature, the flow of the gas may be continuous and uninterrupted in all parts of the apparatus under proper control, as above set forth, and the amount of saturated gas which would necessarily enter the mains by allowing a continuous passage through the valve 22 would be practically immaterial, for the reason that if the pressure in the pipe beyond is at the proper equality with the pressure in the apparatus the movement of the heated gas would be slow, while if the pressure in the pipe beyond be the lower the flow from the apparatus would be controlled by the valve 22. In case it be desired to melt the frost and ice accumulated in receptacle 10 by means of the steam admitted through the inlet-pipe 15 the flow of gas may be interrupted by closing the valves 21 and 22 until the liquid is ejected and the receptacle be again reduced to the initial temperature.

The cylinder 1 is an ordinary compressor, such as are in common use, and is equipped with the usual appliances for maintaining the normal temperature of the gas, and for this purpose I have also introduced the water-receptacle 24, supplied by pipe 5 and drained by the outlet 6, so that the immersion of the compression-receptacle 3 in the water is purely a matter of economy.

In case it should be desirable to dehydrate the gas by means of compression only the step of refrigeration in receptacle 10 may be dispensed with in the following manner: The valve 21 should be allowed to remain wide open. The pressure in both receptacles 3 and 10 will then be equal, and by means of the pump 1 and the valve 22 may be maintained at the desired degree, as indicated by the gages 8 and 18. If then the temperature as indicated by the thermometer 17 be at or near normal degree, the compression step is sufficient, especially when by reason of low pressure in the mains the gas may expand upon leaving the apparatus; but if the temperature should be deemed too high or the pressure in the mains be at or near equality with the pressure in the apparatus refrigeration may be easily introduced into receptacle 10, as above pointed out.

Having described my invention, what I claim as new, and desire to secure by Letters Patent, is—

1. The herein-described method of dehydrating gas which consists in subjecting gas to a pressure precipitating vapors suspended therein, then separating the resultant precipitations from the gas and finally expanding the gas to its normal pressure, substantially as described.

2. The herein-described method of dehydrating gas which consists in subjecting gas to first a pressure and then low temperature precipitating vapors suspended therein, then separating the resultant precipitations from the gas and finally expanding the dehydrated gas, substantially as described.

3. The method of dehydrating gas which consists in compressing the gas into a receptacle to precipitate moisture, at the same time cooling the gas to neutralize the heats of compression and ejecting the liquid, subsequently subjecting the gas in a compressed state to a low temperature to congeal or freeze any remaining moisture, then heating the congealed mass to a melting temperature and ejecting the liquid thus formed, from said receptacle, substantially as described.

4. The herein-described method of dehydrating gas which consists in maintaining a volume of gas under a pressure precipitating moisture suspended therein, adding gas to and subtracting from such volume in substantially equal proportions while such volume is being cooled to absorb the heat of compression whereby the dehydrating of the gas is rendered continuous, substantially as described.

5. The method of dehydrating gas which consists in maintaining a volume of such gas under a pressure precipitating moisture and adding to and subtracting from such volume through a contracted inlet and outlet in substantially equal proportions while such volume is being cooled to absorb the heat of compression, whereby the flow of the gas may be uniform and uninterrupted and the moisture contained therein precipitated, substantially as described.

6. The herein-described method of dehydrating gas which consists in maintaining a volume of gas under a pressure precipitating moisture, adding gas to and subtracting from such volume in substantially equal proportions while such volume is being cooled, and refrigerating the volume of compressed gas, whereby a uniform flow of gas and precipitations in the presence of dehydrated gas are maintained against reabsorption, substantially as described.

7. The method of dehydrating gas which consists in cooling the gas while compressed, to a degree precipitating vapors therein, then refrigerating the gas to freeze the moisture and subsequently admitting a further supply of the compressed gas to the refrigerating-chamber, without preliminary cooling, substantially as described.

8. The method of dehydrating gas which consists in subjecting the gas to a low degree of temperature in a closed chamber or passage precipitating and freezing the moisture therein, admitting directly into the refrigerating-chamber in contact with the precipitations therein a cleansing fluid to melt said frozen moisture, and subsequently ejecting the water, substantially as described.

9. In dehydraters, the combination with a receptacle adapted to contain gas subjected to artificial compression to precipitate the moisture in the gas and means in said receptacle for subjecting the gas to a low temperature to precipitate the moisture in the compressed gas, of a separate receptacle adapted to heat gas and convey the same into said first-mentioned receptacle to reduce the precipitation to a melting temperature and means for ejecting the liquid from said receptacle, substantially as described.

10. In dehydraters, the combination with a receptacle adapted to contain gas in a compressed state to produce precipitation of the moisture in the gas and means for ejecting the liquid thus formed from said receptacle, of a second receptacle adapted to contain the gas in a compressed state, means in said second receptacle for subjecting the gas to a low temperature to congeal or freeze the moisture in the gas, means for heating the congealed mass to liquefy the same, and means for ejecting the liquid thus formed, from said receptacle, substantially as described.

11. The combination with the receptacle 3 having attached thereto the inlet-pipe 2 with the valve 20 therein, the outlet-pipe 4, and the exit-duct 7 extending into and opening at the lowest point in said receptacle, of the receptacle 10 with the caps and stuffing-boxes 12 and 13, having attached thereto the inlet-pipes 9 and 15 and the outlet-pipe 11 with the valve 22 therein, the exit-duct 16 extending into and opening at the lowest point in said receptacle 10, the pipe 4 extending longitudinally through the same, and the outlet-pipe 4 and the inlet-pipe 9 connecting the receptacles 3 and 10 and intersected by the valve 21, substantially as described.

Witness my hand this 27th day of April, A. D. 1897.

JACOB S. SMITH.

Witnesses:
C. H. TOBIAS,
CHAS. E. SPAAK.